(12) United States Patent
Friberg et al.

(10) Patent No.: US 11,389,936 B2
(45) Date of Patent: Jul. 19, 2022

(54) ELECTRIC PULSE TOOL

(71) Applicant: ATLAS COPCO INDUSTRIAL TECHNIQUE AB, Stockholm (SE)

(72) Inventors: John Robert Christian Friberg, Nacka (SE); Daniel Per Erik Asplund, Huddinge (SE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 412 days.

(21) Appl. No.: 16/462,489

(22) PCT Filed: Jan. 10, 2018

(86) PCT No.: PCT/EP2018/050531
§ 371 (c)(1),
(2) Date: May 20, 2019

(87) PCT Pub. No.: WO2018/137928
PCT Pub. Date: Aug. 2, 2018

(65) Prior Publication Data
US 2019/0275650 A1 Sep. 12, 2019

(30) Foreign Application Priority Data
Jan. 24, 2017 (SE) .................................. 1730017-9

(51) Int. Cl.
B25B 23/147 (2006.01)
B25B 21/02 (2006.01)
(Continued)

(52) U.S. Cl.
CPC ........ *B25B 23/1475* (2013.01); *B23P 19/065* (2013.01); *B25B 21/02* (2013.01);
(Continued)

(58) Field of Classification Search
CPC ................. B25B 21/02; B25B 23/1475; Y10T 29/49947; B23P 19/065
See application file for complete search history.

(56) References Cited

U.S. PATENT DOCUMENTS 4,074,772 A * 2/1978 Jonsson ................. G05D 17/02
173/182
4,173,059 A * 11/1979 Hashimoto ........... B25B 23/147
29/240

(Continued)

FOREIGN PATENT DOCUMENTS

CN 102015214 A 4/2011
CN 102639301 B 12/2016
(Continued)

OTHER PUBLICATIONS

Chinese Office Action dated Aug. 26, 2020, issued in Chinese Application No. 201880005593.7.
(Continued)

*Primary Examiner* — Andrew M Tecco
*Assistant Examiner* — Nicholas E Igbokwe
(74) *Attorney, Agent, or Firm* — Holtz, Holtz & Volek PC

(57) ABSTRACT

An electric pulse tool for performing tightening operations, where torque is delivered in pulses to tighten a screw joint, includes an output shaft, a sensor arranged to determine a parameter value associated with the tightening of the screw joint, a processor, and a memory containing instructions executable by the processor. The electrical pulse tool operates to provide torque pulses on the output shaft in a first direction until the determined parameter value associated with the tightening of the screw joint reaches within or above a predetermined first interval including a target parameter value. The electrical pulse tool also operates to provide at least one torque pulse on the output shaft in a second direction that is opposite to the first direction in case (Continued)

the determined parameter value exceeds the target parameter value within a predetermined second interval.

25 Claims, 3 Drawing Sheets

(51) Int. Cl.
  *B23P 19/06* (2006.01)
  *B25B 23/142* (2006.01)
  *B25B 23/00* (2006.01)
(52) U.S. Cl.
  CPC ...... *B25B 23/1425* (2013.01); *B25B 23/0014* (2013.01); *B25B 23/1422* (2013.01); *B25D 2211/064* (2013.01); *B25D 2250/201* (2013.01); *B25D 2250/205* (2013.01); *B25D 2250/221* (2013.01); *Y10T 29/49947* (2015.01)

(56) References Cited

U.S. PATENT DOCUMENTS

| | | | |
|---|---|---|---|
| 5,105,519 A | 4/1992 | Doniwa | |
| 5,848,655 A * | 12/1998 | Cooper | B25B 21/02 173/176 |
| 8,925,645 B2 * | 1/2015 | Harada | B25B 23/1405 173/2 |
| 9,314,908 B2 * | 4/2016 | Tanimoto | B25B 21/02 |
| 2006/0137887 A1 * | 6/2006 | Ohtsu | B25B 21/026 173/2 |
| 2012/0073846 A1 * | 3/2012 | Hirai | B25B 21/02 173/200 |
| 2012/0234566 A1 * | 9/2012 | Mashiko | B25F 5/00 173/93.5 |
| 2012/0279736 A1 * | 11/2012 | Tanimoto | B25B 23/1475 173/2 |
| 2013/0133912 A1 * | 5/2013 | Mizuno | B25B 23/1405 173/180 |
| 2015/0273671 A1 | 10/2015 | Totsu | |
| 2017/0043460 A1 | 2/2017 | Gustafsson | |

FOREIGN PATENT DOCUMENTS

| | | |
|---|---|---|
| EP | 2607020 A1 | 6/2013 |
| EP | 2913155 A1 | 9/2015 |
| WO | 2015139952 A1 | 9/2015 |

OTHER PUBLICATIONS

International Search Report (ISR) and Written Opinion dated Mar. 29, 2018 issued in International Application No. PCT/EP2018/050531.

* cited by examiner

Provide torque pulses in a first direction until a parameter reaches within or above a first interval including a target parameter value — S40

Provide at least one torque pulse in a second direction in case the determined parameter value exceeds the target parameter value within a second interval. — S50

ELECTRIC PULSE TOOL

The disclosure relates to an electric pulse tool for performing tightening operations where torque is delivered in pulses to tighten and/or loosen screw joints.

BACKGROUND

During a tightening operation, in which an electric pulse tool is used for tightening a joint, torque is applied to the joint in pulses by a motor housed inside the electric pulse tool. Often it is desired to control the tightening such that a specific torque or clamp force is installed into the joint. The applied torque may be monitored by a torque sensor, but it may also be monitored by an angle meter, an accelerometer or a gyro that monitors the retardation of the output shaft so as to indirectly monitor the applied torque.

It is often important to achieve high productivity when using electric pulse tools. For instance when the electric pulse tool is used in production productivity is important in order to shorten the time used to produce each unit. Therefore the electric pulse tool is often adapted to tighten screw joints as fast as possible. Adapting the electric pulse tool to tighten screw joints as fast as possible results in that the electric pulse tool provides powerful torque pulses that quickly build up clamp force of the screw joints.

Another advantage to adapt the electric power tool to provide few torque pulses is that the tightening becomes more energy efficient.

A problem associated by adapting the electric power tool to provide few powerful torque pulses is that the accuracy is reduced. Adding much torque by each torque pulse increases the risk of missing the target torque.

One solution to increase the accuracy is to reduce the power of torque pulses towards the end of the tightening.

If the torque during a tightening does not reach the goal torque, torque pulses can be added in order to reach the target. If however the target torque is exceeded, the tightening is determined to be unsuccessful. And a correction must be performed. In the best case the operator can loosen the screw joint and tighten the screw joint again. In the worst case the detail where the screw joint is provided needs to be replaced.

For hand held power tools it is important both that the reaction force that is subjected to the operator is as low as possible and that the time of concluding a specific tightening operation is as low as possible. An operator may conduct many hundreds of tightening operations during a working cycle. It is therefore important that they are both ergonomic for the well-being of the operator and rapid for the productivity at the work station. An ergonomic tightening operation typically implies that the reaction torque is as low as possible.

Hence, there is a need for an electric pulse tool that is adapted to deliver a torque pulses in which the installed torque may be controlled and in which a tightening operation may be performed rapidly with a high reliability.

SUMMARY OF THE DISCLOSURE

An object of the present disclosure is to provide an electric pulse tool that can correct itself if the determined parameter value associated with the tightening of a screw joint exceeds the target parameter value within a first interval.

This object is achieved in accordance with a first aspect of the disclosure by an electric pulse tool for performing tightening operations, where torque is delivered in pulses to tighten a screw joint. The electric pulse tool comprising, an output shaft; a sensor arranged to determine a parameter value associated with the tightening of the screw joint; a processor and a memory containing instructions executable by the processor, whereby the electrical pulse tool (10) is operative to, provide torque pulses on said output shaft in first direction until the determined parameter value associated with the tightening of the screw joint reaches within or above a predetermined first interval including a target parameter value and provide at least one torque pulse on said output shaft in a second direction that is opposite to the first direction in case the determined parameter value exceeds the target parameter value within a predetermined second interval.

In accordance with a second aspect the disclosure relates to a method in an electric pulse tool for performing tightening operations, where torque is delivered in pulses to tighten a screw joint, the electric pulse tool comprising: an output shaft; a sensor arranged to determine a parameter value associated with the tightening of the screw joint, wherein the method comprises the steps of, providing torque pulses on the output shaft in a first direction until the determined parameter value associated with the tightening of the screw joint reaches within or above a predetermined first interval including a target parameter value; and providing at least one torque pulse on the output shaft in a second direction that is opposite to the first direction in case the determined parameter value exceeds the target parameter value within a predetermined second interval.

An advantage with exemplary embodiments of the disclosure is an aggressive tightening were only a few tightening need to be corrected. The majority of the tightening become very fast. A total time saving of the time used to tighten screw joints is thus achieved.

SHORT DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION OF THE SHOWN EMBODIMENT OF THE DISCLOSURE

Figure 1:
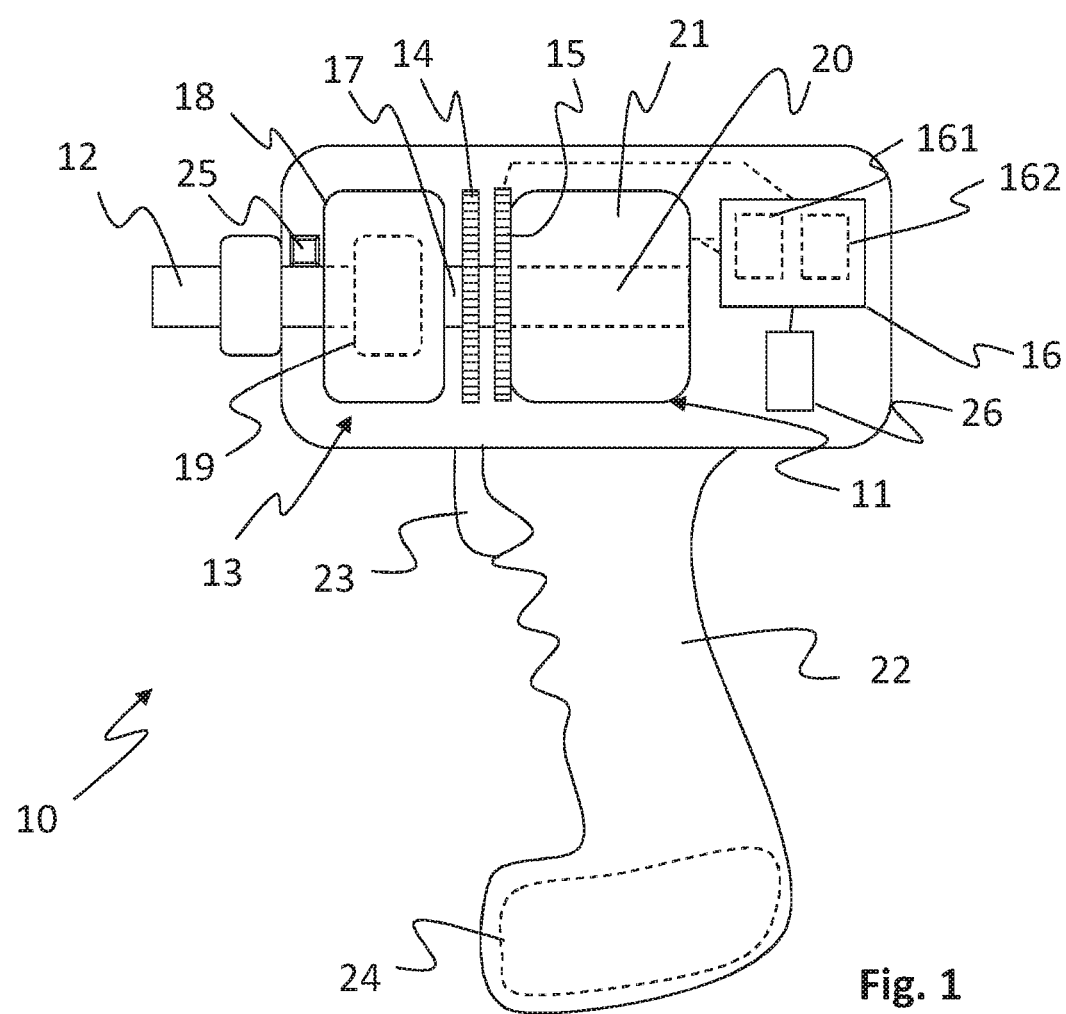
FIG. 1 is a schematic representation of a pulse tool according to an exemplary embodiment of the disclosure.

Aspects of the present disclosure will be described more fully hereinafter with reference to the accompanying drawings. The device, method and computer program disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In FIG. 1 an electric pulse tool 10 in accordance with a specific embodiment of the disclosure is schematically shown. The pulse tool 10 is configured to perform tightening operations where torque is delivered in pulses to tighten screw joints. For this purpose the pulse tool 10 comprises a bidirectional electric motor 11 which is arranged to deliver torque in two opposite rotational directions, i.e. clockwise and counter clockwise.

The electric pulse tool 10 further comprises a handle 22, which is of a pistol type in the shown embodiment. The disclosure is however intended to cover any type of handheld pulse tools. The disclosure is not limited to handheld electric pulse tools, but can also be implemented in other types of electrical pulse tools. A power supply 24, such as a battery, is arranged in the lower part of the handle and a trigger 23 is arranged for manipulation of the operator so as to power the electric motor 11. The power supply may also be a connection to an electric cable.

Further, the pulse tool comprises an output shaft 12 and a sensor 14, 15, 25 arranged to determine a parameter value associated with the tightening of the screw joint. The sensor may be a torque sensor, an angle sensor, an accelerometer, a gyro, or the like. In the shown embodiment there is a first sensor 14, 15 that consists of an angle sensor that monitors the rotation of an input shaft 17 by means of a rotational sensor part 14 and a static sensor part 15. A second sensor 25 in the form of a torque sensor is arranged on the output shaft 12. For the disclosure either an angle sensor or a torque sensor is needed, not both. However, both sensors may be provided to offer increased accuracy or redundancy.

The shown embodiment further comprises a pulse unit 13 comprising an inertia body 18 that houses a piston activated rotator 19. The inertia body 18 is rigidly connected to the input shaft 17 and driven by a rotor 20 of the motor 11. The rotor 20 is in the shown embodiment arranged coaxially inside a stator 21 of the motor 11. A pulse is generated as cam surfaces (not shown) on the inside of the inertia body 18 interacts with the pistons so as to force the rotator 19 to rotate in a conventional manner well known in the art.

The disclosure is however not limited to pulse tools with a pulse unit. Pulses may also be produced in pulse tools with a direct connection between the motor and the output shaft by pulsing the output of the motor of the pulse tool. The disclosure also covers such pulse tools and striking pulse tools often known as impact wrenches.

For a pulse tool including a pulse unit the sensor 14, 15, 25 arranged to determine a parameter value associated with the tightening of the screw may be arranged to monitor both the rotation of the inertia body 19 and the retardation of the inertia body 19. The retardation may be used to calculate the torque that is installed into the joint. In case the sensor 14, 15, 25 arranged to determine the parameter value associated with the tightening of the screw joint is a torque sensor 25 the sensor 25 can measure the torque directly. The torque sensor 25 is then arranged on the output shaft 12 as close as possible to the joint in order to monitor the delivered torque.

An object of the present disclosure is to provide an electrical pulse tool 10 that can correct itself if the determined parameter value associated with the tightening of the screw joint exceeds the target parameter value within a first interval. This object is according to an exemplary embodiment of the disclosure achieved by the electric pulse tool being operative to provide at least one torque pulse in a second direction that is opposite to the first direction in case the determined parameter value exceeds the target parameter value within a predetermined second interval. Thus the electric pulse tool according to this exemplary embodiment only provides at least one torque pulse in a second direction in case the determined parameter value exceeds the target parameter value within the predetermined second interval.

If however the determined parameter value exceeds the target value by more than said predetermined second interval the tightening is determined to be unsuccessful. In an exemplary embodiment of the present disclosure the electrical pulse tool 10 is then operative to provide a notification that the screw joint was tightened to hard.

An advantage with the electric pulse tool 10 according to the present disclosure is thus that the electrical pulse tool 10 can provide an aggressive tightening were only a few tightening need to be corrected. The majority of the tightening become very fast. A total time saving of the time used to tighten screw joints is thus achieved.

Another advantage with the electric pulse tool 10 according to the present disclosure is that the first interval can be narrowed compared to if an electric pulse tool which cannot correct the tightening is used. This since the electric pulse tool 10 can correct the tightening if the determined parameter value associated with the tightening of the screw joint exceeds the target parameter value within a first interval. If the first interval is narrowed a larger number of tightening will require correction. A time savings by using the electric pulse tool 10 is however achieved since the torque pulses in the first and second direction are typically very short, e.g. 30 ms.

Referring back to FIG. 1, the electric pulse tool 10 further comprise a processor 16 arranged to control the electric motor 11. The electric pulse tool 10 also comprises a memory 26 containing instructions executable by the processor 16. The processor 16 is a Central Processing Unit, CPU, microcontroller, Digital Signal Processor, DSP, or any other suitable type of processor capable of executing computer program code. The memory 26 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the electric pulse tool 10 causes the electric pulse tool 10, 32 to perform any of the aspects of the disclosure described herein.

When the above-mentioned computer program code is run in the processor 16 of the electric pulse tool 10 it causes the electric pulse tool 10 to provide torque pulses on the output shaft 12 in a first direction until the determined parameter value associated with the tightening of the screw joint is within or above a predetermined first interval including a target parameter value. The computer program codes further causes the electrical pulse tool 10 to provide at least one torque pulse on the output shaft 12 in a second direction that is opposite to the first direction in case the determined parameter value exceeds the target parameter value within a predetermined second interval.

According to one aspect of the disclosure the processor 16 comprises one or several of:
a first providing module 161 adapted to provide torque pulses on the output shaft 12 in first direction until the determined parameter value associated with the tightening of the screw joint reaches within or above a predetermined first interval including a target parameter value;

a second providing module 162 adapted provide at least one torque pulse on the output shaft 12 in a second direction that is opposite to the first direction in case the determined parameter value exceeds the target parameter value within a predetermined second interval.

The first providing module 161 and second providing module 162 are implemented in hardware or in software or in a combination thereof. The modules 161 and 162 are according to one aspect implemented as a computer program stored in the memory 26 which run on the processor 16. The electric power tool 10 is further configured to implement all the aspects of the disclosure as described herein.

Figure 2:
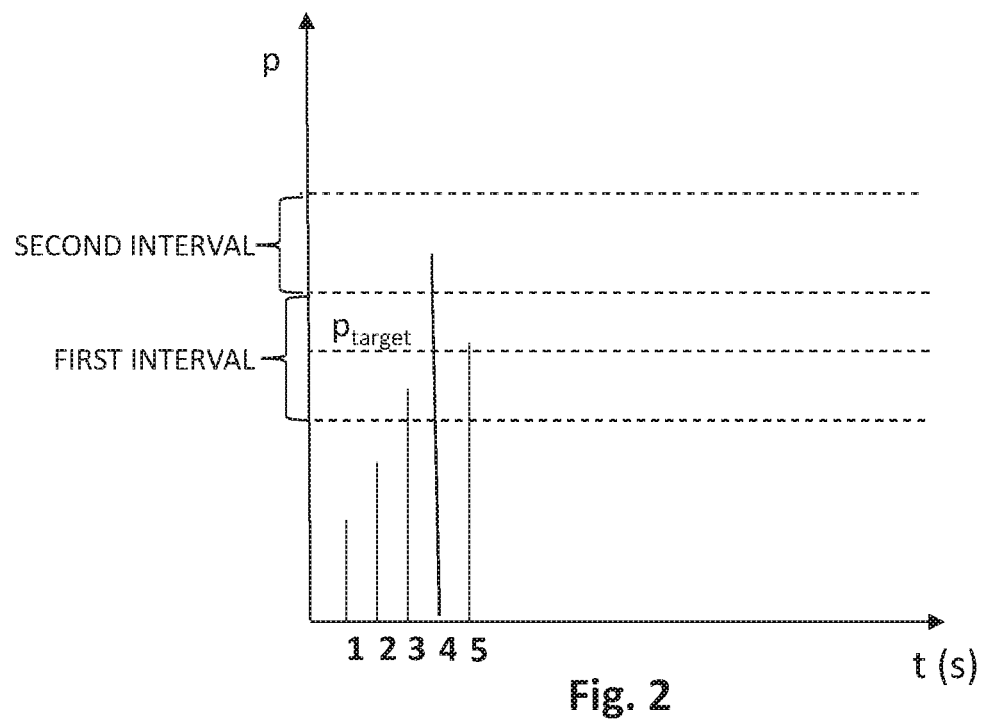
FIG. 2 is a schematic representation of the delivered torque pulses as a function of operation time in an example of a tightening performed by the electric pulse tool.

One example of a tightening performed by the electric pulse tool 10 according to an exemplary embodiment is illustrated in FIG. 2. In FIG. 2 the determined parameter associated with the tightening of the screw joint is illustrated as a function of time t. In this example the tightening operation is illustrated as comprising 5 torque pulses 1-5. The tightening operation can however require fewer or more torque pulses in order to tighten the screw joint to the target parameter value which lies within the first interval. Each torque pulse in the first direction will add torque and thus increase the parameter associated with the tightening of the screw joint. And each torque pulse in the second direction will reduce the parameter associated with the tightening of the screw joint. As can be seen in FIG. 2 the electric pulse tool 10 provides torque pulses 1 to 4 on the output shaft 12 in the first direction until the determined parameter value associated with the tightening of the screw joint is above the predetermined first interval including the target parameter value. In the tightening illustrated in FIG. 2 the electric pulse tool thus tightens the screw joint too hard since the determined parameter associated with the tightening after pulse 4 reaches above the first interval. Thus, since the determined parameter value associated with the tightening of the screw joint is above the predetermined first interval, but within the second interval the electric pulse tool 10 is operative to provide at least one torque pulse on said output shaft 12 in a second direction. This results in the determined parameter associated with the tightening of the screw joint reaching the first interval. When the determined parameter has reached the first interval the tightening is complete.

Figure 3:
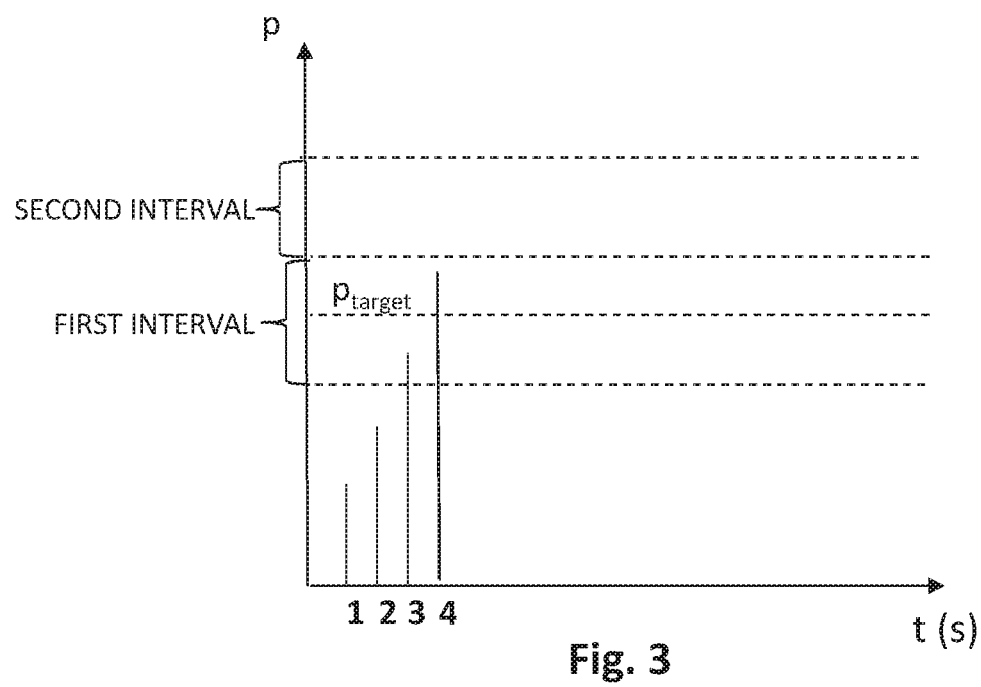
FIG. 3 is a schematic representation of the delivered torque pulses as a function of operation time in an example of a tightening performed by the electric pulse tool.

Another example of a tightening performed by the electric pulse tool 10 according to an exemplary embodiment is illustrated in FIG. 3. As in FIG. 2, the determined parameter associated with the tightening of the screw joint is illustrated as a function of time. In this example the tightening operation is illustrated as comprise 4 torque pulses. The tightening operation can however require fewer or more torque pulses in order to tighten the screw joint to the target parameter value which lies within the first interval. Each torque pulse in the first direction will add torque and thus increase the parameter associated with the tightening of the screw joint. And each torque pulse in the second direction will reduce the parameter associated with the tightening of the screw joint. As can be seen in FIG. 3 the electric pulse tool 10 provides torque pulses 1 to 4 on the output shaft 12 in the first direction until the determined parameter value associated with the tightening of the screw joint is within the predetermined first interval including a target parameter value. In the tightening illustrated in FIG. 3 the electric pulse tool thus tighten the screw joint hard enough since the determined parameter associated with the tightening after pulse 4 reaches within the first interval. Thus since the determined parameter value associated with the tightening of the screw joint is within the predetermined first interval the tightening is complete.

Figures 4, 5:
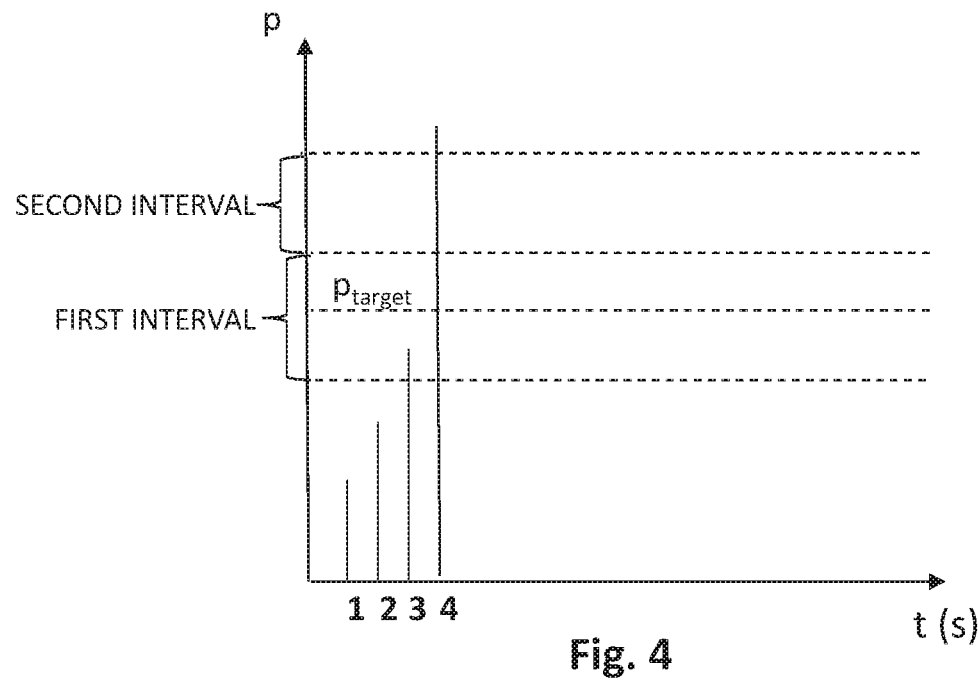
FIG. 4 is a schematic representation of the delivered torque pulses as a function of operation time in an example of a tightening performed by the electric pulse tool.
FIG. 5 is a flow chart illustrating exemplary embodiments of the methods performed in the electric pulse tool.

Yet another example of a tightening performed by the electric pulse tool 10 according to an exemplary embodiment is illustrated in FIG. 4. In this example the tightening operation is illustrated as comprise 4 torque pulses. The tightening operation can however require fewer or more torque pulses. Each torque pulse in the first direction will add torque and thus increase the parameter associated with the tightening of the screw joint. And each torque pulse in the second direction will reduce the parameter associated with the tightening of the screw joint. As can be seen in FIG. 4 the electric pulse tool 10 provides torque pulses 1 to 4 on the output shaft 12 in the first direction until the determined parameter value associated with the tightening of the screw joint reaches above the predetermined first interval. In this tightening the determined parameter value actually reaches above the predetermined second interval. Thus the electric pulse tool 10 tighten the screw joint above an absolute max, which is the upper limit of the second interval. Since the absolute max for the parameter related to the tightening has been exceed the electric pulse tool 10 in this exemplary embodiment is operative to not provide any torque pulse in the second direction. In an exemplary embodiment of the electric pulse tool 10 the electric pulse tool is operative to provide a notification that the screw joint was tightened to hard in case the determined parameter value exceeds the target value by more than the predetermined second interval.

There are however other exemplary embodiments of the electric pulse tool 10 that provides torque pulses in the second direction even when the second interval has been exceed. In this exemplary embodiment of the electric pulse tool 10 the electrical pulse tool 10 is also operative to provide a notification that the screw joint was tightened to hard since the determined parameter value exceeds the target value by more than the predetermined second interval.

According to another exemplary embodiment of the electric pulse tool 10, the electric pulse tool 10 is further adapted to finish the tightening operation by at least one torque pulse in the first direction in case at least one torque pulse in the second direction has been provided. An advantage with this exemplary embodiment is that the tightening operation is always finished with a torque pulse in the first direction.

Now refer back to FIG. 2, which can be used to illustrate an exemplary embodiment of the electric pulse tool 10. As mentioned above in FIG. 2 the electric pulse tool 10 provides torque pulses 1 to 4 on the output shaft 12 in the first direction until the determined parameter value associated with the tightening of the screw joint is above the predetermined first interval. Thus, the electric pulse tool tightens the screw joint too hard since the determined parameter associated with the tightening after pulse 4 reaches above the first interval. As also mentioned above, since the determined parameter value associated with the tightening of the screw joint is above the predetermined first interval, but within the second interval, the electric pulse tool 10 is operative to provide at least one torque pulse on the output shaft 12 in the second direction. In order for the determined parameter value to again reach the first interval the electrical pulse tool 10, according to an exemplary embodiment, is further operative to determine required pulses in the second direction until the determined parameter value reaches the predetermined first interval.

According to one exemplary embodiment of the electrical pulse tool 10 the sensor 14, 15, 25 is a torque sensor 25 and the parameter value associated with the tightening of the screw joint is torque. In this exemplary embodiment FIGS. 2 to 4 illustrates torque on the y-axis.

In another exemplary embodiment of the electrical pulse tool 10 the sensor 14, 15, 25 is an angle meter and the parameter value associated with the tightening of the screw joint is angle. In this exemplary embodiment FIGS. 2 to 4 illustrates angle on the y-axis.

In yet another exemplary embodiment of the electrical pulse tool 10 the electric pulse tool 10 is further adapted to reduce the power of the torque pulses in the first direction when the determined parameter value is within a predetermined third interval (not shown) below the predetermined first interval. Thus the electrical pulse tool 10 is operative reduce the risk that the determined parameter reaches above the first interval by using less power in the third interval.

According to another exemplary embodiment of the electrical pulse tool 10 the electric pulse tool 10 is further adapted to provide torque pulses in the second direction with a lower power compared to the torque pulses in the first direction.

As illustrated in FIGS. 2 to 4, the lower boundary of the first interval can be below the target value. In these exemplary embodiments the electric pulse tool 10 can provide tightening were the determined parameter reaches below the target value.

In another exemplary embodiment of the electric pulse tool 10, the lower boundary of the first interval is the target value. In these exemplary embodiments the electric pulse tool 10 can only provide tightening were the determined parameter reaches the target value or above the target value.

FIG. 5 illustrates the steps in a method, performed in an electric pulse tool 10 for performing tightening operations according to the above described exemplary embodiments. As in the above described exemplary embodiments, torque is delivered in pulses to tighten a screw joint. Also, as above the electric pulse tool 10 comprises an output shaft 12, a sensor 14, 15, 25 arranged to determine a parameter value associated with the tightening of the screw joint.

In a first step 40 the electric pulse tool provides torque pulses on the output shaft 12 in a first direction until the determined parameter value associated with the tightening of the screw joint is within a predetermined first interval including a target parameter value. In a next step 50 at least one torque pulse is provided on the output shaft 12 in a second direction that is opposite to the first direction in case the determined parameter value exceeds the target parameter value within a predetermined second interval.

According to one exemplary embodiment of the method, the second interval is right above the first interval.

In another exemplary embodiment, the method comprises a further step of providing a notification 60 that the screw joint was tightened to hard in case the determined parameter value exceeds the target value by more than the predetermined second interval.

According to another exemplary embodiment, the method comprises a further step 70 of determining required 70 pulses in the second direction until the determined parameter value reaches the predetermined first interval.

In a yet another exemplary embodiment of the method, the sensor 14, 15, 25 is a torque sensor 25 and the parameter value associated with the tightening of the screw joint is torque.

In a yet another exemplary embodiment of the method the sensor 14, 15 25 is an angle meter (14, 15) and the parameter value associated with the tightening of the screw joint is angle.

According to another exemplary embodiment, the method further comprises to reduce the power of the torque pulses in the first direction when the determined parameter value is within a predetermined third interval below the predetermined first interval.

According to another exemplary embodiment, the method further comprises to finish the tightening operation by at least one torque pulse in the first direction in case at least one torque pulse in the second direction has been provided.

An advantage with this exemplary embodiment is that the tightening operation is always finished with a torque pulse in the first direction.

According to another exemplary embodiment, the method further comprises to provide torque pulses in the second direction with a lower power compared to the torque pulses in the first direction.

In an exemplary embodiment of the method, the lower boundary of the first interval is the target value.

In another exemplary embodiment of the method, the lower boundary of the first interval is below the target value.

In an exemplary embodiment of the method the electric pulse tool 10 is a handheld electric pulse tool 10.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. An electric pulse tool for performing tightening operations, where torque is delivered in pulses to tighten a screw joint, the electric pulse tool comprising: an output shaft; a sensor arranged to determine a parameter value associated with the tightening of the screw joint; a processor; and a memory containing instructions executable by the processor, whereby the electrical pulse tool operates to:
   provide torque pulses on the output shaft in a first direction until the determined parameter value associated with the tightening of the screw joint reaches within or above a predetermined first interval including a target parameter value; and
   provide at least one torque pulse on the output shaft in a second direction that is opposite to the first direction in case the determined parameter value exceeds the target parameter value within a predetermined second interval.

2. The electric pulse tool according to claim 1, wherein the second interval is right above the first interval.

3. The electric pulse tool according to claim 1, wherein the electrical pulse tool further operates to provide a notification that the screw joint was tightened too hard in case the determined parameter value exceeds a target value by more than the predetermined second interval.

4. The electric pulse tool according to claim 1, wherein the electrical pulse tool operates to determine required pulses in the second direction until the determined parameter value reaches the predetermined first interval.

5. The electric pulse tool according to claim 1, wherein the sensor is a torque sensor and the parameter value associated with the tightening of the screw joint is torque.

6. The electric pulse tool according to claim 1, wherein the sensor is an angle meter and the parameter value associated with the tightening of the screw joint is angle.

7. The electric pulse tool according to claim 1, wherein the electric pulse tool is adapted to reduce power of the torque pulses in the first direction when the determined parameter value is within a predetermined third interval below the predetermined first interval.

8. The electric pulse tool according to claim 1, wherein the electric pulse tool is adapted to finish the tightening operation by at least one torque pulse in the first direction in case at least one torque pulse in the second direction has been provided.

9. The electric pulse tool according to claim 1, wherein the electric pulse tool is adapted to provide torque pulses in the second direction with lower power compared to the torque pulses in the first direction.

10. The electric pulse tool according to claim 1, wherein a lower boundary of the first interval is a target value.

11. The electric pulse tool according to claim 1, wherein a lower boundary of the first interval is below a target value.

12. The electric pulse tool according to claim 1, wherein the electric pulse tool is a handheld electric pulse tool.

13. A method in an electric pulse tool for performing tightening operations, where torque is delivered in pulses to tighten a screw joint, the electric pulse tool comprising: an output shaft; and a sensor arranged to determine a parameter value associated with the tightening of the screw joint, wherein the method comprises:
   providing torque pulses on the output shaft in a first direction until the determined parameter value associated with the tightening of the screw joint reaches within or above a predetermined first interval including a target parameter value; and
   providing at least one torque pulse on the output shaft in a second direction that is opposite to the first direction in case the determined parameter value exceeds the target parameter value within a predetermined second interval.

14. The method according to claim 13, wherein the second interval is right above the first interval.

15. The method according to claim 13, wherein the method further comprises providing a notification that the screw joint was tightened too hard in case the determined parameter value exceeds a target value by more than the predetermined second interval.

16. The method according to claim 13, wherein the method further comprises determining required pulses in the second direction until the determined parameter value reaches the predetermined first interval.

17. The method according to claim 13, wherein the sensor is a torque sensor and the parameter value associated with the tightening of the screw joint is torque.

18. The method according to claim 13, wherein the sensor is an angle meter and the parameter value associated with the tightening of the screw joint is angle.

19. The method according to claim 13, wherein the method further comprises reducing power of the torque pulses in the first direction when the determined parameter value is within a predetermined third interval below the predetermined first interval.

20. The method according to claim 13, wherein the method further comprises providing torque pulses in the second direction with lower power compared to the torque pulses in the first direction.

21. The method according to claim 13, wherein the method further comprises finishing the tightening operation by at least one torque pulse in the first direction in case at least one torque pulse in the second direction has been provided.

22. The method according to claim 13, wherein a lower boundary of the first interval is a target value.

23. The method according to claim 13, wherein a lower boundary of the first interval is below a target value.

24. The method according to claim 13, wherein the electric pulse tool is a handheld electric pulse tool.

25. A computer-readable storage medium, having stored there on a computer program which, when run in an electrical pulse tool, causes the electrical pulse tool to perform the method according to claim 13.

* * * * *